Figure 1:
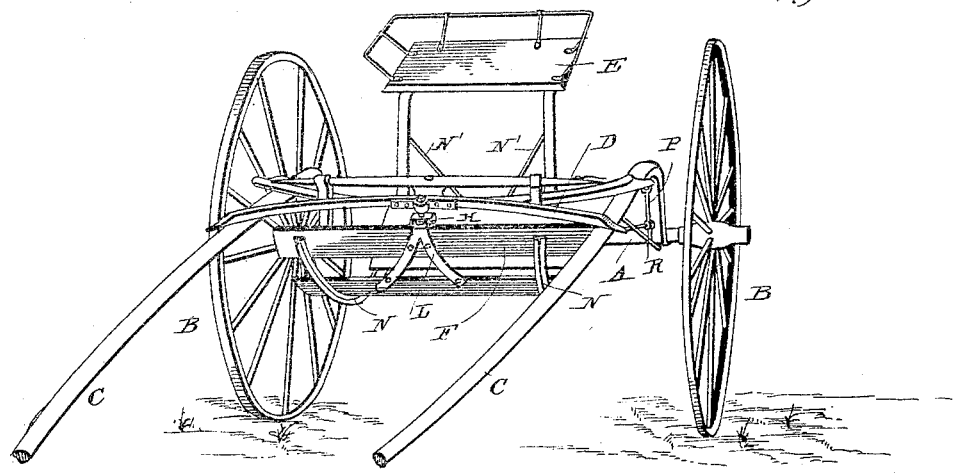

(No Model.)

G. H. CARROLL.
ROAD CART.

No. 437,811. Patented Oct. 7, 1890.

WITNESSES
Edwin I. Yewell
Chas Holm

INVENTOR
George Henry Carroll
By John G. Manahan
His Attorney—

THE NORRIS PETERS CO., PHOTO-LITHO., WASHINGTON, D. C.

UNITED STATES PATENT OFFICE.

GEORGE HENRY CARROLL, OF STERLING, ILLINOIS.

ROAD-CART.

SPECIFICATION forming part of Letters Patent No. 437,811, dated October 7, 1890.

Application filed January 16, 1890. Serial No. 337,142. (No model.)

*To all whom it may concern:*

Be it known that I, GEORGE HENRY CARROLL, a citizen of the United States, residing at Sterling, in the county of Whiteside and State of Illinois, have invented certain new and useful Improvements in Road-Carts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to improvements in road-carts, and pertains more especially to mechanism for attaching or suspending the occupant's seat and foot-board to the running-gears of the vehicle in such a manner as that neither the lateral motion of the animal nor his vertical movements will be communicated to said seat and foot-board.

It is well known that the movement of the horse attached to a vehicle is of a twofold character—first the lateral swing of the body, and second a vertical movement of his body coincident with each step. As the thills are required to be strapped rather tightly to the horse in order to prevent any tilting movement of the axle, the tendency is, unless avoided in some way, to transmit these motions of the animal to the seat of the vehicle, a result which is uncomfortable to the occupant thereof.

In my invention the purpose is to allow the thills and axle to be oscillated in a horizontal plane without communicating such motion to the body of the vehicle. This is accomplished at the rear of the body by suspending each end of the transverse spring upon which the rear end of the body rests in pendent rods adapted to oscillate both lengthwise and crosswise of the vehicle, and, further, to permit such lateral flexibility I suspend the front end of said body centrally to the cross or tenter bar, which connects the two thills in such a manner that said body may have a pivotal movement in a horizontal plane. To relieve the occupant from the discomfort of the vertical movement aforesaid of the animal, I provide at the forward central support aforesaid of the body a secondary joint or pivot in a vertical plane, which permits said body at its forward connection aforesaid to freely turn in a vertical plane independently of the supporting-thills and cross-bar. The hinged or pivotal connection of the upper ends, respectively, of the downwardly-suspended rods aforesaid permits a like flexibility or freeness of the rear end of said body, so that by the combined pivotal attachment afforded by the hinged character of the upper ends of said supporting-rods and the central pivoting aforesaid of the front end of said body, in both a horizontal and a vertical plane, the communicating connection which would otherwise exist between the body and the supporting portion of the vehicle is severed, and each of said parts is at liberty to move or to be moved independent of the other.

Figure 2:
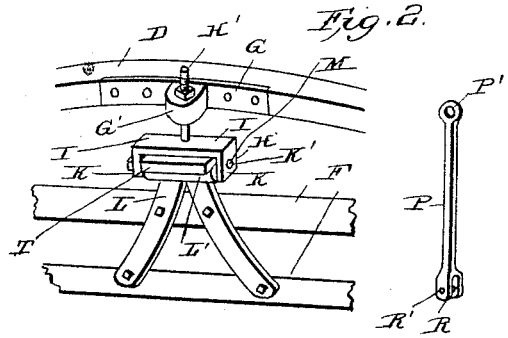
Figure 3:
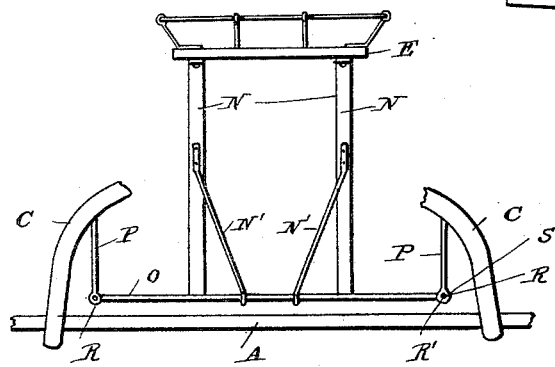

In the drawings, Figure 1 is a perspective from the front, partially oblique, of a cart provided with my invention. Fig. 2 is a detail of the front central pivotal support before referred to and of rod P. Fig. 3 is a view from the rear of that portion of said cart embodying my invention.

A is the usual axle supported upon the two carrying-wheels B B.

C C are the thills attached in any suitable way at their rear ends to the axle A.

D is the forward tenter-bar transversely connecting the thills C and slightly bent in a horizontal plane toward the rear.

E is the occupant's seat, and F the foot-board. These last two named parts are made integral with each other and can be of any of the usual shapes or kinds and adapted to carry one or more occupants.

To the front face of the tenter-bar D is suitably bolted a metallic plate G, slightly curved to conform to the contiguous surface of said bar. On the front wall of the plate G is centrally formed a vertical socket G'.

H is a vertical clutch provided with the central upwardly-extending stem H', adapted to be passed upward through the socket G', and sustained therein by a nut screwed on the upper end of said stem and resting on the upper surface of said clutch. The clutch H, directly below the socket G', is extended each way laterally, and at the respective outer ends of said extensions I I the same are turned downward to form the supporting-ears K K. Holes K' are formed in line transversely through the ears K K.

L is a clip bifurcated at its lower end or otherwise adapted to be attached at said end centrally to the forward end of the foot-board F.

Upon the upper and forward end of the clip L is formed the transverse horizontal socket L', adapted to be projected upward within the ears K K, and suspended pivotally therein by means of a round bolt M, passed transversely through the holes K' in the ears K and said socket L' in clip L.

The connection just described of the forward end of the foot-board F to the tenter-bar D, it is obvious, affords a double pivotal support for the front end of said foot-board—that is, one having a vertical and a horizontal axis—thus permitting the latter to have free oscillation in both a vertical and horizontal plane.

Longitudinal curved bars N N are extended from the front end of the foot-board F to the rear, and at their rear ends bend upward and backward and form supports for the seat E, or said foot-board and seat may be connected in any other suitable way.

Downwardly-converging braces N' are attached, respectively, at their upper ends to the bars N N beneath the seat E, and at their lower and converged ends are seated in any suitable manner upon the spring O. The ends of the spring O are supported from the thills C C by means of pendent rods P P. In the upper ends of the rods P respectively are formed the transverse holes P', through which said rods are suspended loosely in any suitable manner at their upper ends to the under side of the thills C C, respectively. The lower ends of the rods P P are bifurcated, forming depending ears R, which hang in line with or lengthwise of the vehicle. Horizontal holes R' are formed in the lower end of the ears R, and the ends of the spring O are projected, respectively, within the ears R, and supported pivotally therein by means of horizontal bolts S, passed through the ears R and a suitable hole in the end of the spring O, lengthwise of the cart. This suspension of the rear end of body permits said body to have its aforesaid horizontal oscillation at its aforesaid central support by the rods P P oscillating laterally to permit the lateral freedom of the rear end of said body. The pivotal connection of the upper ends of the rods P permits a vertical oscillation of the thills C C, caused by the movement of the horse, without communicating said oscillation to the body of the vehicle.

By means of the above-described flexible connection of both front and rear of the body to the running-gears of the cart said running-gears may experience both the vertical and lateral oscillation before mentioned without either of the same being communicated to the body of the vehicle. I have verified the correctness of the statement last made by practical use of a full-sized cart constructed in the manner described.

T is a rubber cushion between clutch H and clip L to prevent rattling.

What I claim as my invention, and desire to secure by Letters Patent of the United States, is—

1. In a road-cart, the support of the body of the vehicle centrally at its front end to the running-gears thereof by means of a double or universal joint having a vertical and a horizontal axis and at its rear end by means of pendent rods adapted to swing in any direction, substantially as shown, and for the purpose described.

2. The combination of the running-gears of a cart, the body thereof, a universal joint connecting said parts centrally at the forward extremity of the body of the vehicle, and pendent rods adapted to swing in every direction pivotally attached at their upper ends to the thills of the cart and pivotally attached at their lower ends to the rear end of said body, substantially as shown, and for the purpose described.

3. The combination of the thills C C, suitably supported at their rear ends by the axle A, the seat E, foot-board F, plate G, provided with socket G', clutch H, clip L, and the rods P P, pivotally suspended from thills C, respectively, and pivotally attached at their lower ends, respectively, to the rear of the body of the vehicle, substantially as shown, and for the purpose described.

4. The combination of the thills C C, axle A, wheels B, seat E, foot-board F, a centrally-located universal joint suspending the front end of said foot-board to said thills, spring O, and rods P P, pivotally attached at their upper ends to said thills and at their lower ends to said spring, substantially as shown, and for the purpose described.

In testimony whereof I affix my signature in presence of two witnesses.

GEORGE HENRY CARROLL.

Witnesses:
JOHN G. MANAHAN,
JOHN F. BARRETT.